Patented Apr. 19, 1932

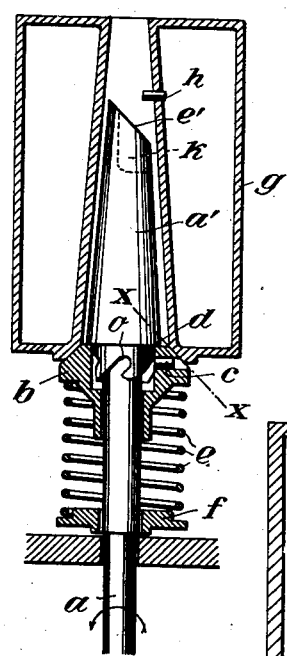
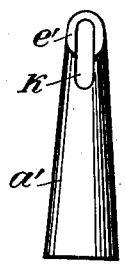
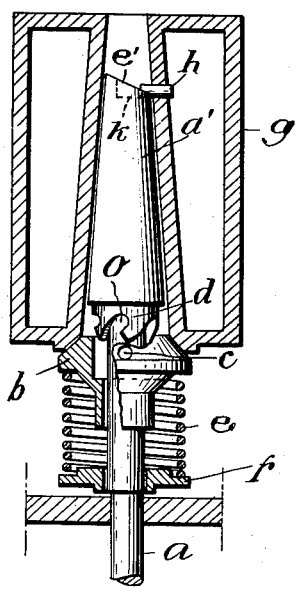
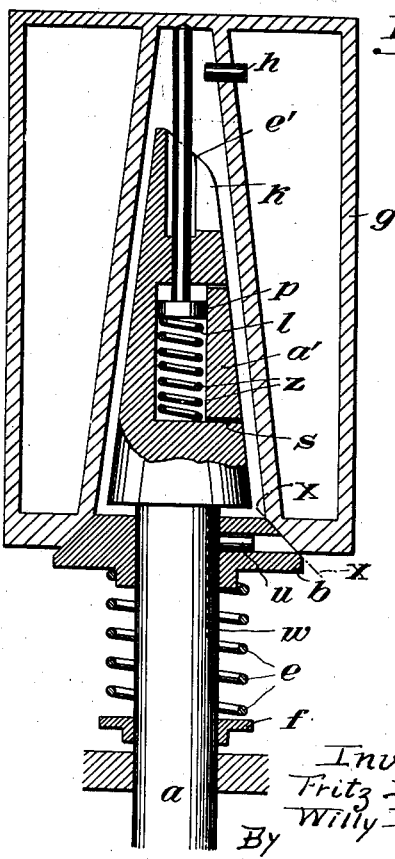

1,854,829

UNITED STATES PATENT OFFICE

FRITZ DÖRING, OF BERLIN-FROHNAU, AND WILLY LOHS, OF BERLIN-CHARLOTTEN-BURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

COUPLING FOR REVOLVING PARTS

Application filed March 12, 1929, Serial No. 346,305, and in Germany March 14, 1928.

Our invention relates to improvements in couplings for revolving parts.

The known devices for the smooth coupling of revolving parts under a predetermined angle to each other no longer satisfy the present day requirements as regards economy and service reliability. The great number of the mechanical parts necessary, including electric switch-gear, are the cause of frequent breakdowns.

Our invention solves this problem in the simplest manner and by purely mechanical means. According to our invention the elements to be coupled are first brought to approximately the same speed of rotation by means of a friction clutch, while, through the medium of suitable retarding means, the interengagement of the positive clutch whereby said elements are to be connected in a predetermined phase position is delayed until sufficient uniformity in the number of revolutions per minute in both elements has been reached. With this arrangement it is possible to provide a smooth change from the friction clutch to the positive clutch which is free from jars and other disturbances.

Two embodiments of our invention are illustrated in the drawings affixed hereto and forming part of our specification. In the drawings Fig. 1 is a sectional elevation of a complete device embodying our invention, Fig. 2, the device for the rigid coupling in phase of the driving and driven parts in elevation, Fig. 3, a modified device embodying our invention in sectional elevation, and Fig. 4 shows the device illustrated in Fig. 1 with the parts positively coupled with each other.

Like parts are indicated by like letters of reference throughout all the figures of the drawings.

Referring to Fig. 1 of the drawings, $a$ is a shaft or spindle revolving at a definite speed around a vertical axis. Upon this shaft is mounted angularly and axially movable a friction cone $b$ provided with a radial bore into which is inserted a pin $c$. This cone $b$ is supported by a spring $e$, the lower end of which rests upon a disc $f$, which is either loose or fast upon the shaft $a$ and axially supported thereon. A coupling or clutch member $d$ keyed to the shaft $a$ is provided with openings or slots $o$ extending obliquely downward and one of which is engaged by the pin $c$ in the state of rest and during the greater portion of the coupling process. When the drum or cylinder $g$ which is provided with a central tapering bore terminating at one end in a flaring mouth is placed upon the upper tapering part $a'$ of the rotating shaft $a$, a tangentially acting friction force is developed at its contacting surface with the friction cone $b$ indicated by the line $x$—$x$, which gradually entrains the drum $g$. The opposing forces thus created at the friction cone $b$ are developed in the direction indicated by the arrow in Fig. 1 and serve to force the pin $c$ located on the friction cone $b$ into the openings or slots $o$ formed on the clutch member $d$ carried by the shaft $a$. The force effective on the friction cone $b$ results from the weight of the drum $g$, the tension of the spring $e$ and the aforesaid opposing forces. The walls of the openings $o$ are so formed that the frictional engagement of the pin $c$ therewith is relieved only when a sufficient uniformity in the speeds of rotation of the drum $g$ and the shaft $a$ effective upon the cone $b$ has been reached. At this stage the friction cone $b$ slides downwardly upon the shaft $a$ so that the pin $c$ passes out of the particular opening or slot $o$ in which it happens to be located. The drum $g$ accordingly drops correspondingly and brings the pin $h$ into engagement with the oblique or bevelled face $e'$ of the tapering portion $a'$ of the shaft $a$ from which said pin $h$ slides into the groove or slot $k$ shown in Fig. 2. Now the drum $g$ and the shaft $a$ are positively coupled in the predetermined relative position by the groove $k$ and the pin $h$ and the tapering portion $a'$ of the shaft $a$.

It is obvious that the speed has no effect upon the mode of operation of the device. The impact may likewise easily be controlled by adapting to the requirements the decisive factors, viz. the weight and the distribution of the mass of the drum, angle, diameter and material of the friction cone or the friction surface, the state of the friction surface and the strength of the spring. Essential for the effect desired is that there exist two forces at right angles to each other, viz. the frictional resistance variable with the speed ratio of the parts to be coupled, and then a further force, preferably gravity. It will, however, be understood that the latter may be replaced by any other equivalent force whereby corresponding results are attained.

While in the embodiment illustrated in Figs. 1 and 2 of the drawings the delay in the engagement of the positive coupling is attained by suitably shaping the openings $o$ of the clutch member $d$, so that a downward sliding motion of the part to be coupled is first prevented, the delay or retarded motion in the second embodiment illustrated in Fig. 3 of the drawings is attained by a dashpot.

Referring to this figure it will be observed that upon the shaft $a$ revolving around a vertical axis there is mounted the friction cone or coupling flange $b$ so as to be axially slidable on said shaft and supported by the spring $e$ resting with its lower end upon a disc $f$. The flange may engage a groove $w$ in the shaft $a$ by means of a pin $u$ provided in a radial bore of the disc. If the part to be coupled, for instance the drum $g$, is placed upon the friction cone $b$ of the shaft $a$, a friction force is developed at the bevelled contacting face $x$—$x$, which entrains the drum $g$ or the like with increasing speed.

Under the action of gravity the drum $g$ descends and forces a piston $p$ downwardly against the resistance of a spring $z$ within a cylinder $l$ provided in the cone $a'$ of the shaft $a$, from which the air is permitted to escape slowly only through a duct $s$. By suitably dimensioning the duct $s$ the time of the descent of the drum $g$ may be so timed that the positive coupling $h$, $k$ comes into engagement then only, when the speed of the shaft and the drum coincide with sufficient accuracy. When the drum or reel is raised, the spring $z$ returns the piston $p$ into the initial position.

The novel arrangement is capable of being efficiently utilized for instance in installations such as illustrated which include the drum $g$ adapted to be coupled to the shaft $a$ while the latter is rotatively operated. In such case, in order to bring about a smooth connection of the drum with the shaft, it is necessary to first bring the drum to a speed of rotation which corresponds approximately with that of the shaft $a$. As it is essential to the coupling operation that the drum $g$ and shaft $a$ are secured together in a predetermined phase position, the coupling connection must be in the nature of a positive clutch such as for instance the pin $h$ and groove $k$. In order to prevent an interengagement of the pin $h$ and groove $k$ or their equivalents before the number of revolutions per minute of the two elements $g$ and $a$ correspond to a sufficient extent, the device includes a retarding means which permits the pin $h$ to slide into the groove $k$ only after both elements $g$ and $a$ have approximately the same number of revolutions per minute. In this way it is possible to positively protect the shaft $a$ from jars and shocks. This is of extreme importance in maintaining synchronism for instance between a receiving element and a sending element, since with the relatively small synchronizing forces which may only be available even very slight jars will bring such an arrangement out of step. The coupling of the drum $g$ upon the shaft $a$ during the rotation of the latter comes into question, for instance, in picture transmission systems, in which the drum $g$ serves as a carrier for the light sensitive paper, and in which the drum $g$ must be removed for the purpose of receiving new paper sheets, and the driving shaft cannot be efficiently stopped each time, because of the fact that the re-establishment of the synchronism takes too much time.

Various modifications and changes may be made without departing from the spirit and the scope of the invention, and I desire, therefore, that only such limitations shall be placed thereon as are imposed by the prior art.

We claim as our invention:

1. In an automatic coupling for connecting revolving elements smoothly and in phase, the combination of co-operating coupling devices whereby said elements are positively connected to rotate in unison, and means carried by one of said elements and arranged to frictionally engage the other element to gradually bring said elements to approximately the same revolutions per minute, said means maintaining said co-operating coupling devices out of engagement with each other until the revolutions per minute of said elements are in approximate accord with each other.

2. In an automatic coupling for connecting revolving elements smoothly and in phase, the combination of a driving shaft, an element adapted for connection with said shaft for rotation therewith, co-operating coupling devices on said shaft and element normally out of engagement with each other, a friction clutch member rotatable with said shaft and movable lengthwise thereof, said friction clutch member being arranged to frictionally engage said element to gradually bring it to approximately the same revolutions per minute with said shaft, and being movable lengthwise of said shaft to bring said coupling devices into engagement with each other when the revolutions per minute of said shaft and element are substantially in accord with each other, and clutch means whereby said friction clutch member is initially in positive connection with said shaft, said clutch means being rendered inactive by the lengthwise movement of said friction clutch member when said shaft and element rotate at approximately the same speed.

3. In an automatic coupling for connecting revolving elements smoothly and in phase, the combination of a driving shaft, a tapering member fixed upon said shaft and having a bevelled outer end provided with a coupling recess, a co-operating member adapted for connection with said shaft provided with a tapering axial bore to receive said tapering member and having a bevelled seat at its inner end, a coupling pin carried by said co-operating member normally at a distance from the bevelled outer end of said tapering member arranged to slide over said bevelled outer end into the coupling recess for positively connecting said co-operating member with said shaft, a friction clutch member rotatable with said shaft and movable lengthwise thereof, said friction clutch member being arranged to frictionally engage the bevelled seat of said co-operating member to gradually bring the latter to approximately the same revolutions per minute with said shaft, and being movable lengthwise of said shaft to shift the coupling pin into the coupling recess, a slotted clutch member fixed upon said shaft, a clutch pin carried by said friction clutch member and projecting into a slot of said slotted clutch member whereby said friction clutch member is initially in positive connection with said shaft, said clutch pin being moved out of said slot by the lengthwise movement of said friction clutch member when said shaft and co-operating member rotate at approximately the same speed; and a spring bearing against said friction clutch member for yieldingly forcing it in a direction opposed to the said lengthwise movement of said friction clutch member.

In testimony whereof we affix our signatures.

FRITZ DÖRING.
WILLY LOHS.